United States Patent [19]
Crahay

[11] Patent Number: 4,462,660
[45] Date of Patent: Jul. 31, 1984

[54] MODULATING A LASER BEAM

[75] Inventor: Jean Crahay, Francorchamps, Belgium

[73] Assignee: Centre De Recherches Metallurgiques-Centrum Voor Research in de Metallurgie, Brussels, Belgium

[21] Appl. No.: 405,885

[22] Filed: Aug. 6, 1982

[30] Foreign Application Priority Data

Aug. 6, 1981 [LU] Luxembourg ............................ 83535

[51] Int. Cl.³ ............................................ G05D 25/00
[52] U.S. Cl. .................................... 350/274; 350/275
[58] Field of Search ........................ 350/273, 274, 275

[56] References Cited

U.S. PATENT DOCUMENTS 2,029,348  2/1936  Van Denburg ..................... 350/275
4,118,619  10/1978  McArthur et al. ................ 350/274

Primary Examiner—Bruce Y. Arnold
Assistant Examiner—William Propp
Attorney, Agent, or Firm—Holman & Stern

[57] ABSTRACT

An apertured rotary member intermittently intercepts a laser beam directed at a given zone of a target. The apertures have inclined lateral walls which, during interception of the beam, deflect at least part of it to a further zone of the target.

34 Claims, 3 Drawing Figures

MODULATING A LASER BEAM

BACKGROUND OF THE INVENTION

The present invention relates to a method of modulating a laser beam.

Various types of high power lasers are at present known. However, among the various types in existence, only molecular $CO_2$ lasers have a sufficient strength and output to enable them to be used industrially. These lasers, however, whose power may extend to tens of kilowatts, are designed for continuous operation. They may not be used, therefore, when a modulated high power beam is required, as, for example, in the case of surface treatment of metal components or pulse cutting.

Moreover, the modulation of high power beams has serious drawbacks from the thermal and mechanical point of view. Various ways of modulating a laser beam are in fact known.

One way consists in varying in an electrical manner the electrical excitation current of the emitter tube. However, the response time is too long and it is not possible to modulate the beam above 1000 variations per second using this means.

Optical modulators are also known, such as vibrating mirrors and electro-optical or opto-acoustic modulators. However, these cannot always be used, because of serious heat dissipation problems as soon as the power of the beam is greater than 100 W. Vibrating mirrors, for example, must be water cooled, which requires a high mass and limits the frequency of vibration of the mirror and, consequently, the frequency of modulation of the laser beams.

A further known procedure consists in using a disc rotating in the beam and drilled with holes or provided with slots on its periphery which enable the beam to pass through in a partial or complete manner, the beam thus being chopped up with a frequency depending on the speed of rotation of the disc. Using this known type of apertured disc, a considerable portion of the energy of the laser beam cannot be used as it is either reflected or absorbed by the opaque portions of the disc separating the successive apertures. This system has a further serious drawback in the case in which it is necessary to carry out very high frequency modulation of high power beams.

By way of example, for a beam having a diameter of 20 mm and corresponding to a power of 2 kW which is to be modulated at a rate of 10,000 pulses per second by means of a disc provided with slots having a width of 20 mm separated by opaque portions of 20 mm, the peripheral speed of the disc must be considerably greater than the speed of sound in air.

SUMMARY OF THE INVENTION

The inventor has now discovered a procedure which enables, on one hand, the use of at least part of the energy which was previously lost and therefore a substantial improvement of the energy balance for the operation and, on the other hand, modulation at frequencies which may be very high of a high power laser beam by means of a chopper disc without the disc being subjected to excessive peripheral speeds.

The invention provides a method of modulation of a laser beam, in which an apertured rotary member, preferably a disc provided with holes or slots, rotates in the beam while enabling all or part of the beam to pass therethrough intermittently, the lateral walls of the apertures enabling passage of the laser beam being inclined with respect to the axis of the beam so as to deflect at least part of the beam, during the stage of interception of the beam, towards another zone of the target.

Preferably, the lateral walls of the apertures are substantially parallel so as to offset the zone of impact of the deflected beam on the target either to the front or to the rear of the zone treated by the non-deflected beam, so as to ensure, in the direction of relative displacement of the rotary member and the target, either pre-heating or post-heating (e.g. tempering) of the zone treated by the non-deflected beam.

According to a particularly advantageous variant, in the case of high frequency modulation of a high power laser beam, the rotary member is disposed in a region in which the cross-section of the beam is smaller than its initial cross-section, preferably in a focusing cone of the beam.

If the beam normally has a focusing cone, for example in order to concentrate the energy of the beam on a small area of the surface of a component, the rotary member is advantageously disposed between the focusing lens and the component to be treated.

If the beam does not have the focusing cone, use is advantageously made of an afocal system, i.e. an optical system whose focal point is located at infinity, which focuses the beam and then provides it with its initial parallelism, the rotary member then being disposed along a focusing cone formed in this way.

The arrangement of the rotary member in a region in which the beam has a reduced cross-section enables the dimensions of the apertures to be reduced and consequently enables their number to be increased and the speed of rotation of the rotary member to be decreased, for the same frequency of modulation. In this arrangement, the rotary member is subjected to a greater energy density as a result of the reduction of the cross-section of the laser beam. It is therefore advantageous to provide means for protecting this member in order to prevent its degradation by the energy beam.

In a first embodiment, the rotary member may be manufactured at least partly from a material which reflects the beam, in particular from a material which is a good conductor of electricity, such as copper, aluminium, stainless steel, or carbon steel.

The rotary member of reflecting material may advantageously be provided, at least on the portion of its surface exposed to the laser beam, with a metal coating, for example of gold, in order to increase its power of reflection and/or to prevent its oxidation.

In a further embodiment, the rotary member may be constituted at least partly by an absorbent material. It is preferred that only the portion of its surface exposed to the laser beam and disposed between the successive apertures is constituted by or coated with an absorbent material, for example a metal oxide. For this purpose, an absorbent material which is a good conductor of heat is advantageously selected so as to prevent heating of the rotary member which is too localised.

In particular when the perforated rotary member is disposed in a region in which the beam has a reduced section, for example in a focusing cone, it is particularly advantageous to provide the inclined lateral walls of the apertures with a profile such that the plane of focusing of the deflected beam coincides with the plane of the surface of the target at the point of impact of the deflected beam.

It has been found advantageous to use a rotary member in which at least one dimension, preferably the width, of the apertures which succeed each other for the passage of the laser beam and/or the opaque portions located between the apertures, varies in a random manner along the circumference or concentric notional ring described by the apertures. An arrangement of this type enables the variation, in practice from point to point, of the intensity of the treatment to which the surface of the target is subjected.

The cooling of the rotary member subjected to the laser beam may be carried out in the first instance by the movement of the member itself in air. However, it may be advantageous to provide an additional cooling means, for example a forced transverse current of air or another gas, particularly when the rotary member is disposed in the focusing cone of the laser beam.

BRIEF DESCRIPTION OF THE DRAWINGS

The invention will be described further, by way of example, with reference to the accompanying drawings, in which.

DETAILED DESCRIPTION OF THE INVENTION

Figure 1:
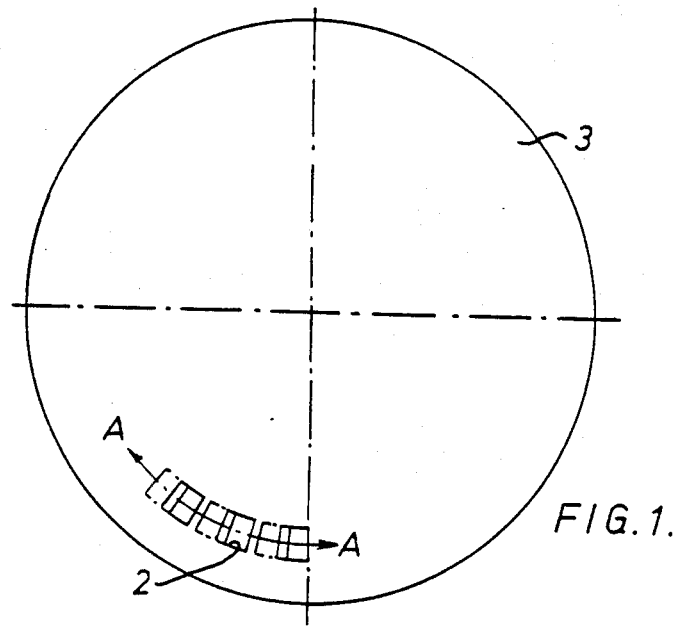
FIG. 1 is a plan view of a disc provided with a sequence of apertures whose lateral walls, i.e. its radial walls, are inclined with respect to the upper surface of the disc.
Figure 2A:
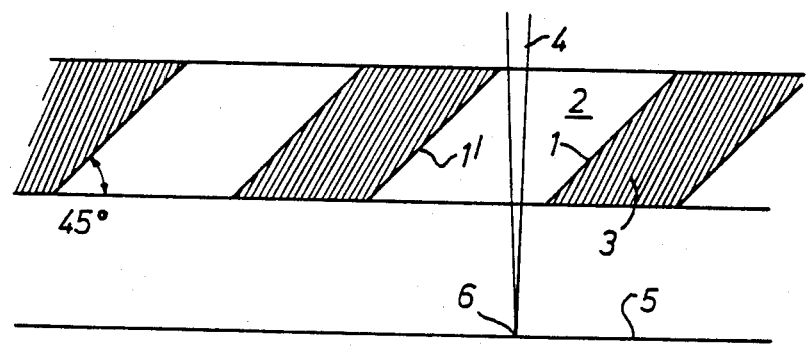
FIG. 2a is a section along the line A—A in FIG. 1, showing the inclination of the lateral walls of the apertures, with a laser beam passing straight through an aperture onto a target.

In FIG. 2a, a focused laser beam 4 passes through a rotary disc 3 via an aperture 2 and strikes a target 5 at a point 6.

Figure 2B:
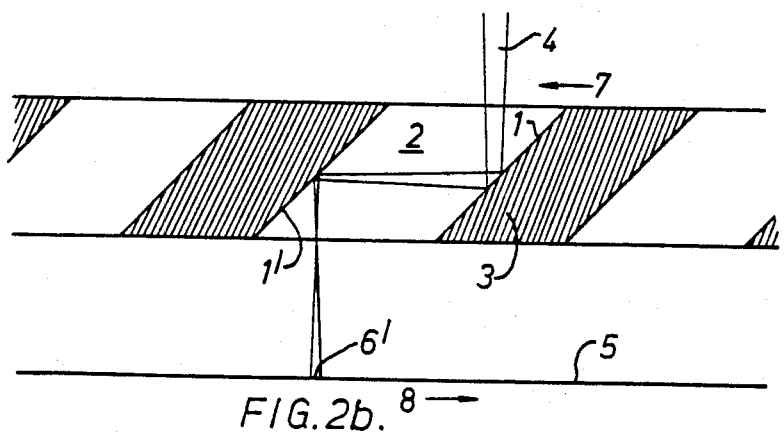
FIG. 2b is similarly to FIG. 2a, but with the beam deflected by the lateral walls of the aperture.

In FIG. 2b, the disc 3 and the target 5 are shown being displaced in the directions shown by the arrows 7 and 8 respectively. At this time, the laser beam 4 is deflected by the mutually parallel inclined (45°) lateral walls 1 and 1' of the aperture 2 and strikes the target at a point 6'. The part of the target at point 6' is therefore subjected to preheating before reaching the point 6 of FIG. 2a.

It is possible to modify the relative direction of movement of the target 5 and the disc 3 to carry out tempering (post-heating) at the point 6' after the treatment at the point 6.

I claim:

1. An apparatus for modulating a focused beam from a laser source, which beam is directed primarily perpendicularly to a given zone at the surface of a moving target, comprising:
   an opaque planar rotary member with a first surface facing the laser beam and a second surface facing the target zone, said surfaces defining a uniform thickness, said member rotatable about a central axis which is substantially parallel to said laser beam and perpendicular to the target zone surface, and said member positioned between said laser source and said target surface zone;
   means for rotating said member about its axis;
   a plurality of apertures through said member, said apertures arranged in a concentric notional ring positioned so that said laser beam consecutively passes through said apertures when said member is rotated; and
   each said aperture comprising first and second lateral walls defined by the thickness of said member, the plane of each of said walls being inclined relative to the axis of the laser beam, so that said first wall intercepts said laser beam when said member is rotated and deflects at least part of the beam from said given zone to a further zone of the target.

2. The apparatus of claim 1 wherein said first wall is inclined at an angle such that said laser beam is deflected in a plane parallel to the direction of movement of said target.

3. The apparatus of claim 1 wherein the lateral walls of each aperture are substantially parallel to each other.

4. The apparatus of claim 3 wherein the lateral walls of each aperture are spaced apart a distance so that a reflection of the laser beam from said first wall impinges on said second wall and is reflected by said second wall towards said target.

5. The apparatus of claim 4 wherein the lateral walls of each aperture are at about a 45° inclination to the axis of the laser beam.

6. The apparatus of claim 4 wherein the distance apart of the lateral walls of each of the successive apertures of said plurality is randomly varied.

7. The apparatus of claim 1 wherein said rotary member is a disk.

8. The apparatus of claim 1 wherein at least said rotary member first surface comprises a material which at least partially reflects said laser beam.

9. The apparatus of claim 1 wherein at least said rotary member first surface comprises a material which at least partially absorbs said laser beam.

10. The apparatus of claim 1 further comprising means for cooling said rotary member additionally to that cooling effected by said member's rotation, comprising a forced current of cooling gas.

11. The apparatus of claim 1 wherein said rotary member is disposed at a point on the path of said beam where the cross-sectional area of the beam is less than its initial cross-sectional area.

12. The apparatus of claim 1 wherein said rotary member is disposed on a focusing cone of said beam.

13. The apparatus of claim 12 wherein an afocal system is disposed along the path of said beam, which system focuses the beam and then provides it with its initial parallelism.

14. The apparatus of claim 1 wherein the plane of focusing of the beam deflected by the inclined lateral walls coincides with the surface of the target in said further zone.

15. The apparatus of claim 1 wherein said rotary member is manufactured at least partly from a material which reflects the beam and is a good conductor of electricity.

16. The apparatus of claim 15 wherein said material is copper, aluminum, stainless steel, or carbon steel.

17. The apparatus of claim 15 wherein said rotary member is provided, at least on the portion of its surface exposed to the laser beam, with a metal coating to increase its power of reflection and/or to prevent surface oxidation.

18. The apparatus of claim 17 wherein said coating is gold.

19. The apparatus of claim 1 wherein said rotary member is manufactured at least partly from an absorbent material which is a good conductor of heat.

20. The apparatus of claim 19 wherein said absorbent material is disposed between the apertures and is a metal oxide.

21. A method for the surface treatment of a moving target, by means of a modulated laser beam directed towards a given zone of said target, wherein the laser beam is intermittently intercepted by an opaque member rotatable about an axis substantially perpendicular to the target surface, said member having a first surface facing the incoming laser beam, a second surface facing in the opposite direction and a series of apertures which each extend from the first to the second surface of said rotary member and which are successively traversed by the axis of the laser beam when said rotary member is rotated, said method comprising directing said incoming laser beam in a direction parallel to said rotation axis, providing said apertures with lateral walls which are inclined relative to the axis of the laser beam, rotating the said rotary member, intercepting at least part of the laser beam by said inclined lateral walls, deflecting said at least part of the laser beam and directing it towards another zone of said target, thereby effecting a preheating or a postheating of said other zone.

22. A method as claimed in claim 21, wherein said other zone of the target is located on the same longitudinal line as said given zone, in the direction of movement of the target.

23. A method as claimed in claim 21, in which the lateral walls of each aperture are substantially parallel to each other.

24. A method as claimed in claim 21, in which the rotary member is disposed at a point on the path of the beam where the cross-sectional area of the beam is less than its initial cross-sectional area.

25. A method as claimed in claim 21, in which the rotary member is disposed along a focusing cone of the beam.

26. A method as claimed in claim 21, in which there is disposed on the path of the beam an afocal system which focuses the beam and then provides it with its initial parallelism, the rotary member being disposed on the focusing cone formed in this way.

27. A method as claimed in claim 21, in which at least part of the rotary member consists of a reflecting material which at least partly reflects the laser beam.

28. A method as claimed in claim 21, in which at least the part of said first surface of the rotary member which is exposed to the laser beam is provided with a reflective coating.

29. A method as claimed in claim 21, in which at least part of the rotary member consists of a material which at least partly absorbs the laser beam.

30. A method as claimed in claim 21, in which at least the part of the said first surface of the rotary member which is exposed to the laser beam is provided with a coating of absorbent material which absorbs the beam.

31. A method as claimed in claim 21, in which the laser beam is a focused beam and the plane of focusing of the beam deflected by the inclined lateral walls coincides with the surface of the target in the said further zone.

32. A method as claimed in claim 21, in which at least one dimension of the successive apertures and/or the successive opaque portions disposed between the apertures varies in a random manner along the series of apertures.

33. A method as claimed in claim 21, including subjecting the rotary member to a forced current of cooling gas.

34. A method as claimed in claim 21, in which the rotary member is a disc.

* * * * *